United States Patent
Koreeda et al.

(10) Patent No.: US 6,790,389 B2
(45) Date of Patent: Sep. 14, 2004

(54) COMPLEX LENS FOR A TANDEM SCANNING OPTICAL SYSTEM AND A MANUFACTURING METHOD THEREOF

(75) Inventors: Daisuke Koreeda, Tokyo (JP); Junji Kamikubo, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/987,871

(22) Filed: Nov. 16, 2001

(65) Prior Publication Data

US 2002/0097475 A1 Jul. 25, 2002

(30) Foreign Application Priority Data

Nov. 27, 2000 (JP) ........................................ 2000-358852

(51) Int. Cl.⁷ .............................................. B29D 11/00
(52) U.S. Cl. ........................................ 264/2.5; 425/808
(58) Field of Search ........................... 264/1.1, 25, 1.7, 264/1.9; 425/808

(56) References Cited

U.S. PATENT DOCUMENTS 4,962,983 A   10/1990  Watanabe
4,999,142 A * 3/1991  Fukushima et al. .......... 264/1.7

* cited by examiner

*Primary Examiner*—Mathieu D. Vargot
(74) *Attorney, Agent, or Firm*—Greenblum & Bernstein, P.L.C.

(57) ABSTRACT

Disclosed is a manufacturing method of a complex lens for a tandem scanning optical system that includes a step for preparing molding dies for forming a cavity to form the complex lens as a single-piece element, and a step for injecting lens material into the cavity. The molding dies include a pair of single-piece mirror surface cores that form a plurality of lens surfaces of the complex lens at an incident side and a plurality of lens surfaces at an exit side, respectively. The complex lens has a plurality of stacked lens portions and the lens portions converging a plurality of light beams, which are modulated independently and deflected by a deflector, onto a surface to be scanned, respectively, for forming a plurality of scanning lines at the same time.

5 Claims, 7 Drawing Sheets

2  4  4a  6  5  3

FIG.7A
FIG.7B
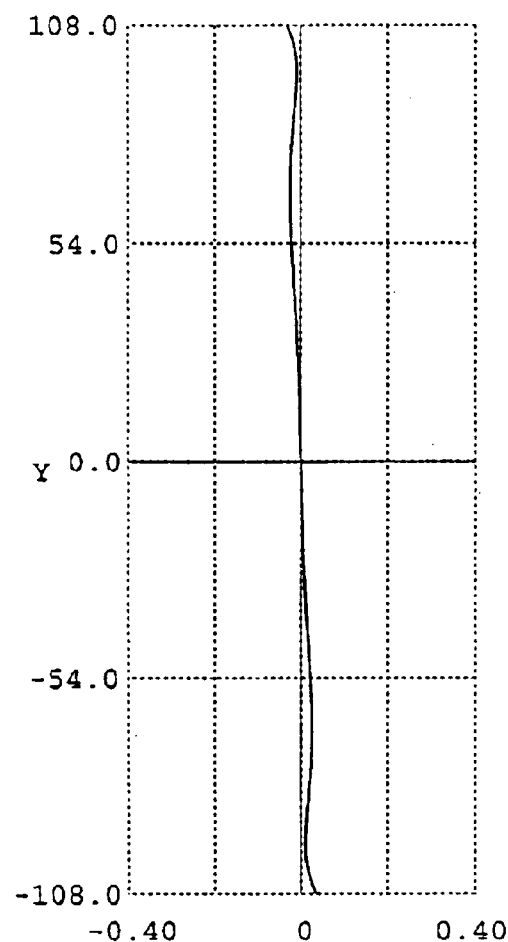
LINEARITY ERROR
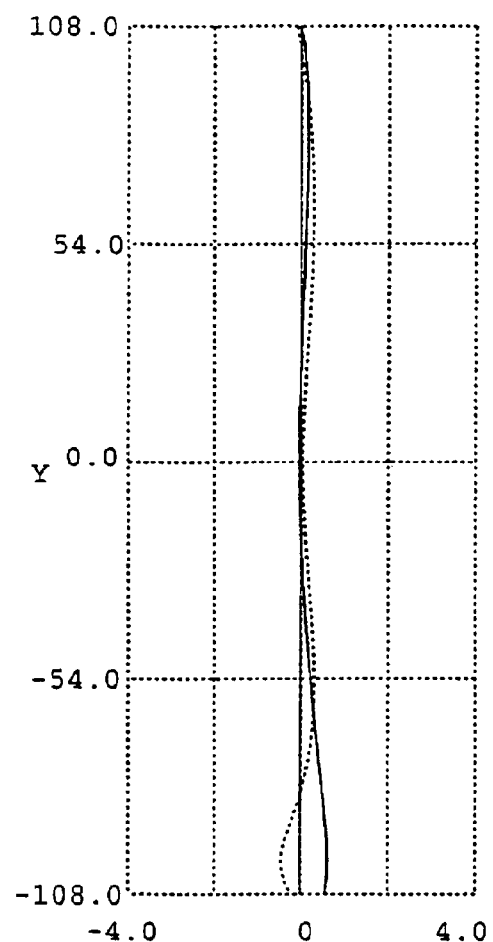
CURVATURE OF FIELD
---------- MAIN SCANNING DIRECTION
———— AUXILIARY SCANNING DIRECTION

LINEARITY ERROR

CURVATURE OF FIELD

·········· MAIN SCANNING DIRECTION
────── AUXILIARY SCANNING DIRECTION

COMPLEX LENS FOR A TANDEM SCANNING OPTICAL SYSTEM AND A MANUFACTURING METHOD THEREOF

BACKGROUND OF THE INVENTION

The present invention relates to a complex lens that consists of a plurality of stacked lens portions, and particularly, relates to the complex lens for a tandem scanning optical system employed in an imaging device such as a color laser printer for converging a plurality of light beams deflected by a deflector. Further, the present invention relates to a manufacturing method of such a complex lens for a tandem scanning optical system.

A tandem scanning optical system employed in a color laser printer is provided with four semiconductor lasers and four photoconductive drums that correspond to colors Y (Yellow), M (Magenta), C (Cyan) and K (blacK), respectively. In such a tandem scanning optical system, it is preferable to make at least one part of the optical system shareable among the colors to downsize the system. The polygon mirror may be shared.

When a polygon mirror is shared, four light beams are incident on the polygon mirror such that they are arranged in an auxiliary scanning direction, which is coincident with a direction of the rotation axis of the polygon mirror. The four light beams deflected by the polygon mirror are converged by an fθ lens and the optical paths thereof are separated by mirrors. The separated four light beams form scanning lines on the respective photoconductive drums.

It is preferable that the four light beams deflected by the polygon mirror are converged by the respective lens elements in order to obtain the most suitable optical performance. On the other hand, the smaller the thickness of the polygon mirror is, the smaller the spaces among the four light beams are in the vicinity of the polygon mirror. This does not allow employing independent lens elements for the respective light beams. Therefore, a lens in the fθ lens arranged close to the polygon mirror should be a complex lens that consists of stacked four lens portions.

SUMMARY OF THE INVENTION

It is therefore an object of the invention to provide an improved manufacturing method of a complex lens for a tandem scanning optical system that is capable of reducing the positional error among the lens portions when the complex lens that consists of stacked lens portions is molded as a single-piece element.

For the above object, according to the present invention, there is provided a manufacturing method of a complex lens for a tandem scanning optical system, including a step for preparing molding dies for forming a cavity to unitarily form the complex lens as a single-piece element, and a step for injecting lens material into the cavity. The molding dies include a pair of single-piece unitarily formed mirror surface cores that form a plurality of lens surfaces of the complex lens at an incident side and a plurality of lens surfaces at an exit side, respectively. The complex lens consists of a plurality of stacked lens portions for converging a plurality of light beams, which are modulated independently and deflected by a deflector, onto a surface to be scanned, respectively, for forming a plurality of scanning lines at the same time.

Further, a complex lens for a tandem scanning optical system according to the present invention is formed as a single-piece element that is equivalent to a combination of independent lens portions stacked one on another, the lens surfaces of the lens portions at the incident side are formed by a single-piece mirror surface core and the lens surface of the lens portions at the exit side are formed by another single-piece mirror surface core.

Since the lens surfaces at the incident side and the lens surface at the exit side are formed by the single-piece mirror surface cores, respectively, during the molding process, the relative positional error among the lens surfaces at the incident side and that at the exit side can be reduced.

It is preferable that each of the mirror surface portions of the mirror surface cores has a concave sectional shape in a direction perpendicular to the direction in which a plurality of light beams scan (i.e., an auxiliary scanning direction). That is, the lens surfaces of the molded complex lens preferably have convex sectional shapes in the direction perpendicular to the scanning direction of the light beam.

When the mirror surface portions of the mirror surface core have convex sectional shapes, the boundary of the mirror surface portions will be a valley. Therefore, the boundary portions cannot be sharply processed because of the limitation of a cutting tool, which requires predetermined margins at the boundaries. The margins are not employed as lens surfaces.

On the other hand, when the mirror surface portions of the mirror surface core have concave sectional shapes, the boundary of the mirror surface portions will be a peak. Therefore, since the boundary portions can be sharply processed by the cutting tool, the mirror surface portions can be processed without the margins.

The mirror surface portions of at least one of the mirror surface cores at the incident and exit sides may be formed as rotationally-symmetrical concave surfaces with respect to respective optical axes such as spherical surfaces. In such a case, the lens surfaces of at least one of the incident and exit sides are formed as rotationally-symmetrical convex surfaces with respect to respective optical axes.

BRIEF DESCRIPTION OF THE DRAWINGS

FIG. 7A is a graph showing a linearity error of the scanning optical system of the first embodiment;

FIG. 7B is a graph showing a curvature of field of the scanning optical system of the first embodiment;

DETAILED DESCRIPTION OF THE PREFERRED EMBODIMENTS

Figure 1A:
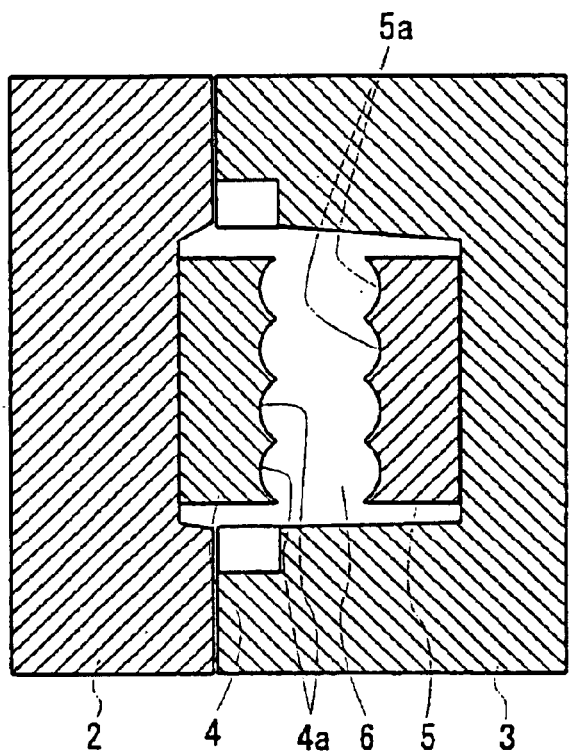
FIG. 1A is a sectional view of a cavity and surroundings of an injection molding machine to mold a complex lens for a tandem scanning optical system according to embodiments.
Figure 1B:
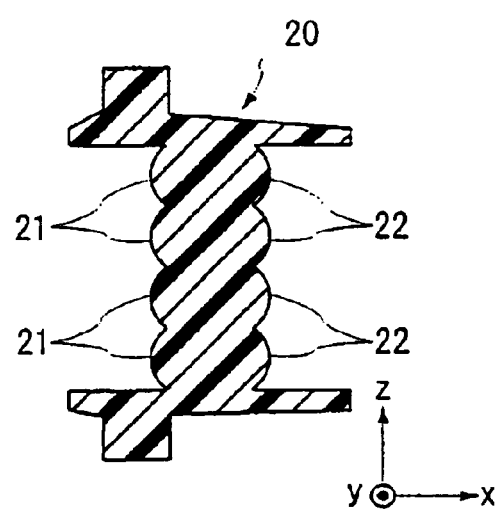
FIG. 1B is a sectional view of the complex lens molded by the injection molding machine of FIG. 1A.
Figure 2:
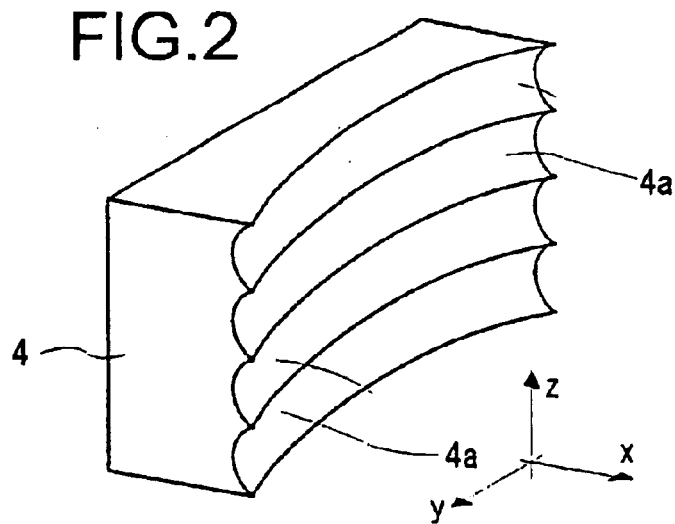
FIG. 2 is a perspective view of a mirror surface core employed in the injection molding machine of FIG. 1A.

A method for manufacturing a complex lens for a tandem scanning optical system will be described with reference to FIGS. 1 through 3. FIG. 1A is a sectional view of a cavity and surroundings of an injection molding machine to mold the complex lens according to embodiments; FIG. 1B is a sectional view of the molded complex lens; FIG. 2 is a perspective view of a mirror surface core; and FIG. 3 is a sectional view of the injection molding machine.

The complex lens is formed as a single-piece element through an injection molding process. Molding dies used in the process include cores having mirror-finished surfaces to form incident lens surfaces and exit lens surfaces of the lens portions. The core is called a "mirror surface core" in this specification.

The general construction of the injection molding machine will be described with reference to FIG. 3. The machine is provided with first and second retainer plates 2 and 3 that can slide in a right-left direction in the drawing in cylinders 1a and 1b located at right and left sides. The retainer plates 2 and 3 have hollows at the faces opposed to each other and mirror surface cores 4 and 5 are installed in the hollows, respectively. A cavity 6 is formed as a space surrounded by molding dies, which include the first and second retainer plates 2, 3, and the mirror surface cores 4 and 5, when the retainer plates 2 and 3 close to contact with each other. Further, the first and second retainer plates 2 and 3 are connected with driving rods 7 and 8, respectively, and the movement of the rods 7 and 8 in the right-left direction drives the retainer plates 2 and 3 to close them up and to move them away.

Figure 3:
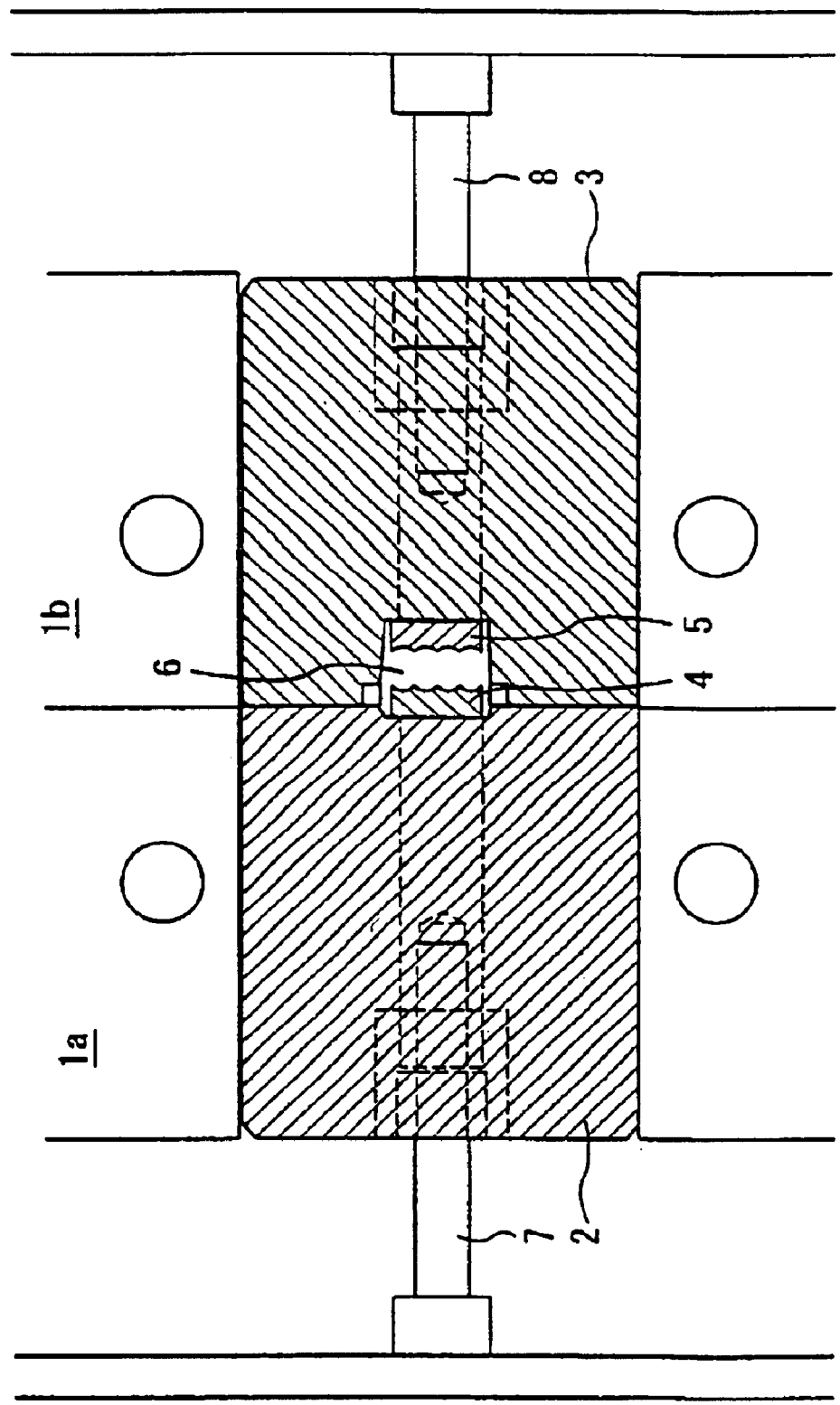
FIG. 3 is a sectional view of the injection molding machine to mold the complex lens of the embodiments.

During the molding process, as shown in FIG. 3, the first and second retainer plates 2 and 3 get closer to contact with each other and molten resin is injected into the cavity 6 through a runner (not shown). After the predetermined cooling time is elapsed from the injection, the retainer plates 2 and 3 are moved away and the molded complex lens is retrieved from the molding dies.

The molded complex lens 20 is formed as a single-piece element that is equivalent to a combination of independent four lens portions stacked one on another, as shown in FIG. 1B. The complex lens 20 has four incident lens surfaces 21 and four exit lens surfaces 22. In FIG. 1B, an x-direction is a direction parallel to each of optical axes of the lens portions, a y-direction is a direction along which the light beams are deflected by a polygon mirror (referred to as a main scanning direction), and a z-direction is a direction perpendicular to the x- and y-directions (referred to as an auxiliary scanning direction). The incident lens surfaces 21 and the exit lens surfaces 22 have convex sectional shapes in the auxiliary scanning direction. Further, in FIG. 1B, the convex shapes of the lens surfaces are exaggerated for purposes of illustration.

The incident lens surfaces 21 are formed (i.e., molded) by the single-piece mirror surface core 4 and the exit lens surfaces 22 are formed (i.e., molded) by the single-piece mirror surface core 5. As shown in FIG. 1A and FIG. 2, the mirror surface core 4 is formed as a single-piece element and is provided with four mirror surface portions 4a that are formed independently to form four lens surfaces. The mirror surface portions 4a have concave sectional shapes in both of the main and auxiliary scanning directions. The other mirror surface core 5 is formed as a single-piece element and is provided with four mirror surface portions 5a that have concave sectional shapes in at least the auxiliary scanning direction.

If the mirror surface cores are independent of one another (i.e., one core corresponds to one lens surface), there may be relative positional errors among the respective mirror surface cores. Since the positional error of the cores results in the positional error among the lens surfaces of the molded complex lens, the image forming performance deteriorates.

On the other hand, since the incident lens surfaces 21 and the exit lens surfaces 22 are formed by the single-piece mirror surface cores 4 and 5, respectively, during the molding process, the relative positional error among the incident lens surfaces 21 and the relative positional error among the exit lens surfaces 22 can be reduced. Further, since the mirror surface portions 4a and 5a have concave sectional shapes in the auxiliary scanning direction, each of the boundaries of the mirror surface portions 4a and 5a are formed as a peak that can be sharply processed by the cutting tool. Therefore, the mirror surface portions can be processed without the margins at the boundary portions, which avoids upsizing of the lens surfaces 21 and 22 in the auxiliary scanning direction more than necessary.

Figure 4:
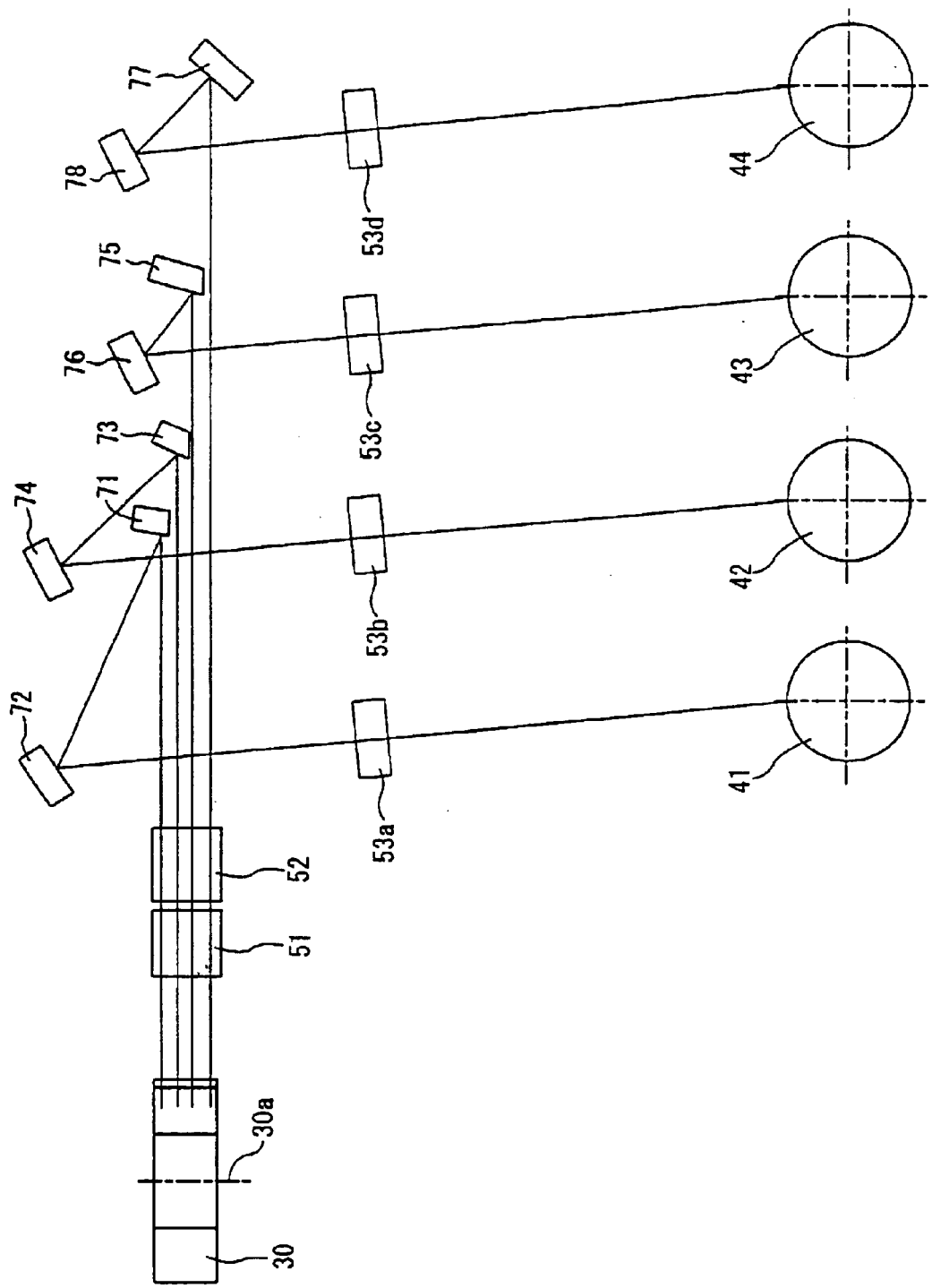
FIG. 4 shows a tandem scanning optical system that employs the complex lens of FIG. 1B in the auxiliary scanning direction.

FIG. 4 is a general description of a tandem scanning optical system, which employs the complex lens manufactured by the above-described method, in the auxiliary scanning direction.

The tandem scanning optical system deflects the four laser beams, which are emitted from light source portion (not shown) and modulated independently, by means of a polygon mirror 30 at the same time, and converges the four laser beams onto the respective photoconductive drums 41, 42, 43 and 44. Rotation of the polygon mirror 30 about a rotation axis 30a scans the laser beam on the photoconductive drums to form four scanning lines at the same time.

An fθ lens to converge the light beams consists of a first lens 51 and a second lens 52 that are located in the vicinity of the polygon mirror 30, and third lenses 53a, 53b, 53c and 53d that are located on the respective optical paths divided by mirrors 71 to 78. The first and second lenses 51 and 52 are the complex lenses, each of which is formed as a single-piece element and it is equivalent to the combination of four independent lens portions stacked one on another as shown in FIG. 1B. Further, each of the lens surfaces of the first and second lens 51 and 52 seems like a flat surface in FIG. 4, while it is not flat surface. Each of the surfaces of the first and second lenses 51 and 52 is a combination surface having four lens portions.

In FIG. 4, the laser beam deflected by the polygon mirror 30 at the highest point among the four laser beams passes through the highest lens portions of the first and second lenses 51 and 52. The laser beam is reflected by the mirror 71 upwards and then reflected by the mirror 72 downwards. The reflected laser beam passes through the third lens 53a and is converged onto the photoconductive drum 41. In the same manner, the second, third and fourth laser beams from the top pass the second, third fourth lens portions of the first and second lenses 51 and 52, and they are reflected by the mirrors 73, 75 and 77 to the upside and then reflected by the mirrors 74, 76 and 78 to the downside, respectively. The reflected second, third and fourth laser beams pass through the third lenses 53b, 53c and 53d and are converged onto the photoconductive drums 42, 43 and 44, respectively.

Next, two embodiments of the tandem scanning optical system whose generic constructions are shown in FIG. 4 will be described. In the following description, the optical system for the first laser beam deflected by the polygon mirror 30 at the highest point is taken out from the four optical systems. Further, the optical path is developed by omitting the mirrors 71 and 72.

First Embodiment

Figure 5:
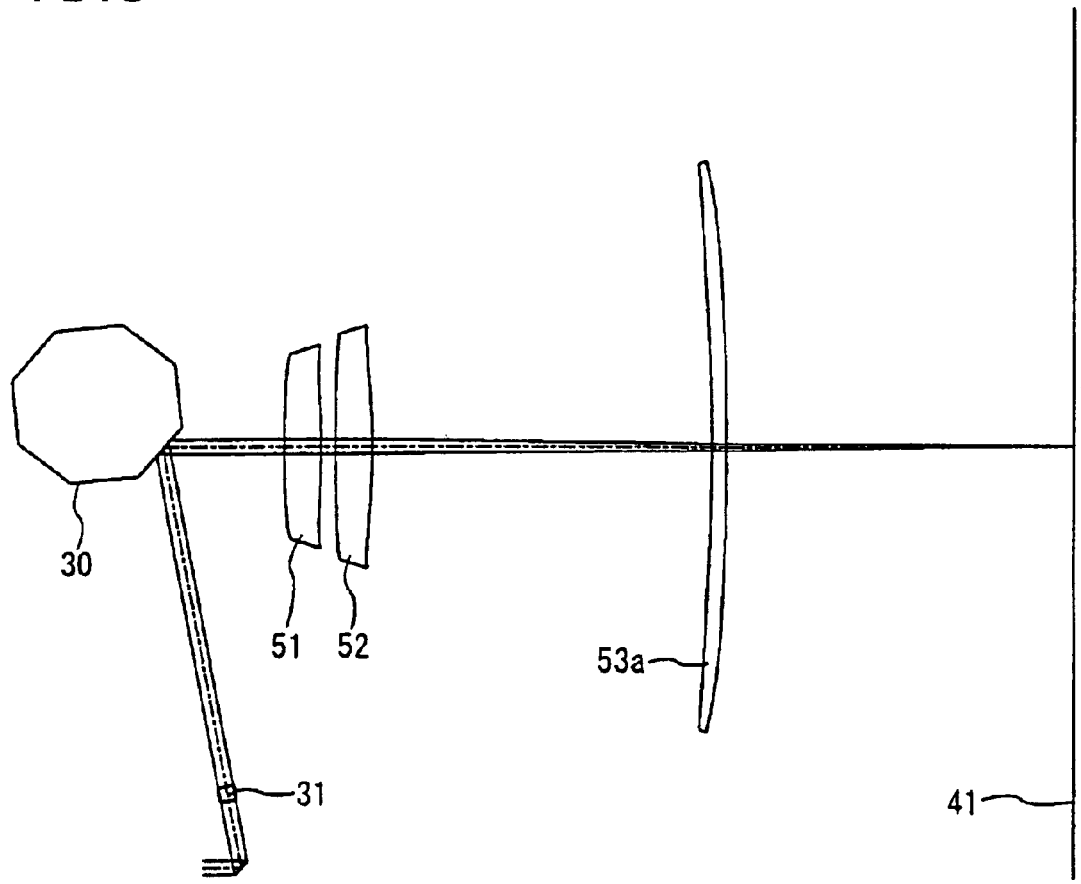
FIG. 5 shows a scanning optical system of a first embodiment in the main scanning direction.
Figure 6:
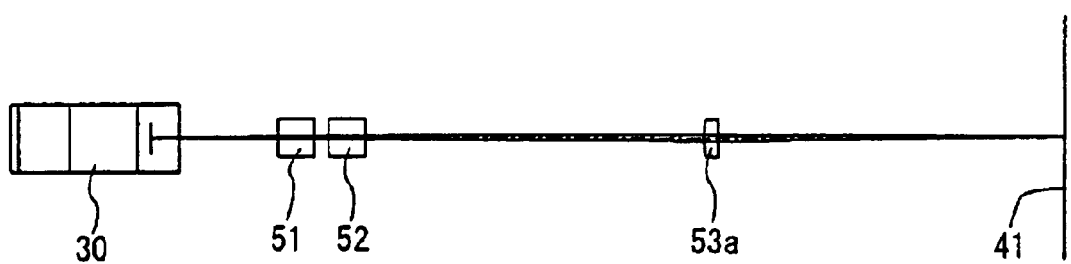
FIG. 6 shows the scanning optical system of the first embodiment in the auxiliary scanning direction.

FIGS. 5 and 6 show a scanning optical system of a first embodiment in the main scanning direction and in the auxiliary scanning direction, respectively. FIG. 5 shows optical elements from a cylindrical lens 31 to the photoconductive drum 41; and FIG. 6 shows optical elements from the polygon mirror 30 to the photoconductive drum 41.

The following TABLE 1 shows the numerical construction of the scanning optical system according to the first embodiment.

Symbol f in the table represents a focal length of the fθ lens in the main scanning direction, W represents the width of the scanning range, ry is a radius of curvature (unit: mm) of a surface in the main scanning direction, rz denotes a radius of curvature (unit: mm) of a surface in the auxiliary scanning direction (which will be omitted if a surface is a rotationally-symmetrical surface), d is a distance (unit: mm) between surfaces along the optical axis, n is a refractive index of an element at a design wavelength 780 nm.

Surface numbers 1 and 2 represent the cylindrical lens 31, a number 3 represents the reflection surface of the polygon mirror 30, numbers 4 and 5 represent the first lens 51 of the fθ lens, numbers 6 and 7 represent the second lens 52 of the fθ lens, numbers 8 and 9 represent the third lens 53a of the fθ lens.

TABLE 1 f = 200.0 mm  W = 216 mm

| Surface Number | ry | rz | d | n |
|---|---|---|---|---|
| 1 | ∞ | 50.00 | 4.00 | 1.51072 |
| 2 | ∞ | — | 97.00 | |
| 3 | ∞ | — | 33.00 | |
| 4 | ∞ | — | 10.00 | 1.48617 |
| 5 | −199.80 | — | 4.00 | |
| 6 | ∞ | — | 10.00 | 1.48617 |
| 7 | −170.00 | — | 93.00 | |
| 8 | −540.00 | 30.38 | 4.00 | 1.48617 |
| 9 | −1045.00 | — | 95.10 | |

The surface of number 1 is a cylindrical surface having a power only in the auxiliary scanning direction, the surfaces of numbers 2 and 3 are flat surfaces, the surfaces of numbers 4, 5, 6, 7 and 9 are rotationally-symmetrical aspherical surfaces, and the surface of number 8 is an anamorphic aspherical surface.

A rotationally-symmetrical aspherical surface is defined by distribution of sag amount X(h). The sag X(h) is a distance of the point on the aspherical surface whose distance from the optical axis is h with respect to the tangential plane at the optical axis. The sags X(h) is expressed by the following equation (1);

$$X(h) = \frac{Ch^2}{1+\sqrt{1-(\kappa+1)^2 C^2 h^2}} + A_4 h^4 + A_6 h^6 + A_8 h^8 \quad (1)$$

Symbol C is a curvature (1/r) on the optical axis, κ is a constant, A4, A6 and A8 are aspherical surface coefficients of fourth, sixth and eighth orders.

The various constants and coefficients for defining the rotationally-symmetrical surfaces are shown in TABLE 2.

TABLE 2

| Surface Number | κ | $A_4$ | $A_6$ | $A_8$ |
|---|---|---|---|---|
| 4 | 0.00 | $3.58 \times 10^{-6}$ | $-5.09 \times 10^{-10}$ | 0.00 |
| 5 | 0.00 | $2.84 \times 10^{-6}$ | $-1.33 \times 10^{-10}$ | $1.00 \times 10^{-14}$ |
| 6 | 0.00 | $1.03 \times 10^{-6}$ | $1.96 \times 10^{-11}$ | 0.00 |
| 7 | 0.00 | $1.06 \times 10^{-6}$ | $3.00 \times 10^{-10}$ | 0.00 |
| 9 | 0.00 | $-4.47 \times 10^{-8}$ | $-1.53 \times 10^{-12}$ | $-1.49 \times 10^{-16}$ |

It should be noted that the radii of curvature of the aspherical surfaces indicated in TABLE 1 are values on the optical axis.

The anamorphic aspherical surface (surface number 8) is a surface whose radius of curvature in the auxiliary scanning direction is determined by the distance from the optical axis in the main scanning direction and it does not have a rotation axis. The anamorphic aspherical surface is defined by the following two equations (2) and (3).

$$X(Y) = \frac{CY^2}{1+\sqrt{1-(\kappa+1)^2 C^2 Y^2}} + A_4 Y^4 + A_6 Y^6 + A_8 Y^8 + A_{10} Y^{10} \quad (2)$$

$$\frac{1}{rz(Y)} = \frac{1}{rz0} + B_1 Y + B_2 Y^2 + B_4 Y^4 + B_6 Y^6 \quad (3)$$

The shape of the anamorphic aspherical surface in the main scanning direction is defined by the sag X(Y) according to the equation (2). The sag X(Y) is a distance of the point on the aspherical surface whose distance from the optical axis is Y in the main scanning direction with respect to the tangential plane at the optical axis.

A radius of curvature in the auxiliary scanning direction varies in accordance with the distance Y from the optical axis in the main scanning direction. The radius of curvature rz(Y) of the surface in the auxiliary scanning direction at the point where the distance from the optical axis is Y is expressed by the equation (3).

Symbols in the equation (2) are the same as in the equation (1). The values $B_1$, $B_2$, $B_4$ and $B_6$ are coefficients that define the radius of curvature in the auxiliary scanning direction, $rz_0$ is a radius of curvature in the auxiliary scanning direction on the optical axis (equal to rz in TABLE 1). The coefficients that define the surface of number 8 are shown in TABLE 3.

TABLE 3

| κ | 0.00 | $B_1$ | $-1.89 \times 10^{-06}$ |
|---|---|---|---|
| $A_4$ | $1.08 \times 10^{-07}$ | $B_2$ | $-1.16 \times 10^{-06}$ |
| $A_6$ | $-1.08 \times 10^{-11}$ | $B_4$ | $5.36 \times 10^{-12}$ |
| $A_8$ | $3.88 \times 10^{-16}$ | $B_6$ | $2.52 \times 10^{-15}$ |
| $A_{10}$ | 0.00 | — | — |

FIGS. 7A and 7B are graphs showing the optical performance of the scanning optical system of the first embodiment; FIG. 7A shows a linearity error that is a deviation of the real beam spot with respect to the ideal beam spot in the main scanning direction; and FIG. 7B shows a curvature of field that is a distance from the design image surface to the beam waist. In the graph of FIG. 7B, a dotted line indicates the values in the main scanning direction and a solid line indicates the values in the auxiliary scanning direction.

Second Embodiment

Figure 8:
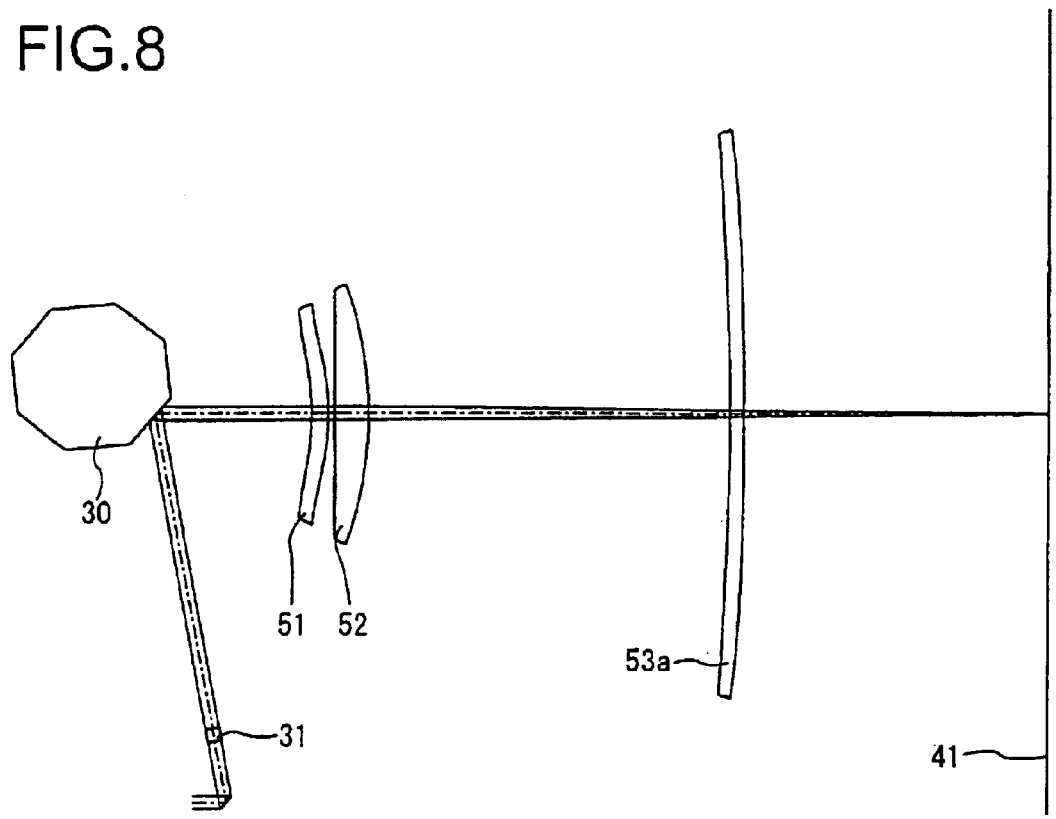
FIG. 8 shows a scanning optical system of a second embodiment in the main scanning direction.
Figure 9:
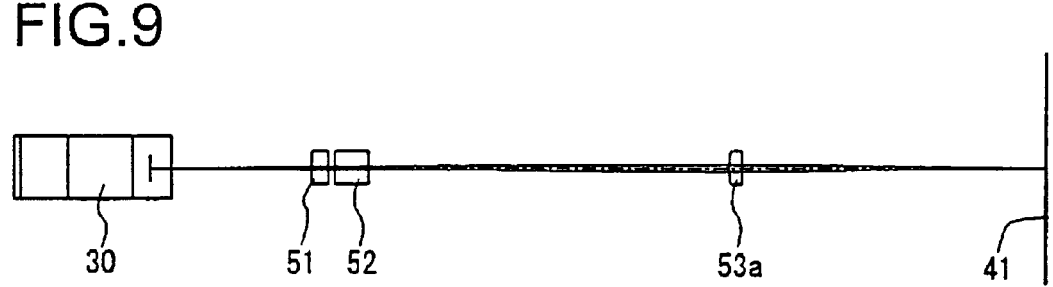
FIG. 9 shows the scanning optical system of the second embodiment in the auxiliary scanning direction.

FIGS. 8 and 9 show a scanning optical system of a second embodiment in the main scanning direction and in the auxiliary scanning direction, respectively. The following TABLE 4 shows the numerical construction of the scanning optical system according to the second embodiment. The relationship between the surface numbers and the optical elements are identical to the first embodiment.

TABLE 4 f = 200.0 mm W = 216 mm

| Surface Number | Ry | rz | d | n |
|---|---|---|---|---|
| 1 | ∞ | 50.00 | 4.00 | 1.51072 |
| 2 | ∞ | — | 97.00 | |
| 3 | ∞ | — | 46.50 | |
| 4 | −75.00 | 1000.00 | 5.00 | 1.48617 |
| 5 | −69.10 | −400.70 | 2.00 | |
| 6 | ∞ | — | 10.00 | 1.51072 |
| 7 | −115.80 | ∞ | 106.50 | |
| 8 | −722.70 | 29.71 | 4.00 | 1.48617 |
| 9 | −1750.80 | — | 90.00 | |

The surface of number 1 is a cylindrical surface having a power only in the auxiliary scanning direction, the surfaces of numbers 2, 3 and 6 are flat surfaces, the surfaces of numbers 4 and 5 are toric aspherical surfaces, the surface of number 7 is a cylindrical surface having a power only in the main scanning direction, the surface of number 8 is an anamorphic aspherical surface and the surface of number 9 is a rotationally-symmetrical aspherical surface.

The toric aspherical surface is defined by the shape in the main scanning direction that is represented by the equation (2) and the radius of curvature in the auxiliary scanning direction rz. The toric aspherical surface is defined as a locus of the aspherical curve line defined by the equation (2) when the aspherical curve line rotates about the axis extending in the main scanning direction that crosses the optical axis at the point whose distance from the surface along the optical axis equals to rz.

The various constants and coefficients for defining the toric aspherical surfaces and the rotationally-symmetrical surface are shown in TABLE 5. The various constants and coefficients for defining the anamorphic aspherical surface are shown in TABLE 6.

TABLE 5

| Surface Number | κ | $A_4$ | $A_6$ | $A_8$ |
|---|---|---|---|---|
| 4 | 0.00 | $2.93 \times 10^{-6}$ | $2.35 \times 10^{-10}$ | 0.00 |
| 5 | 0.00 | $2.56 \times 10^{-6}$ | $3.83 \times 10^{-10}$ | 0.00 |
| 9 | 0.00 | $-3.82 \times 10^{-8}$ | $3.35 \times 10^{-12}$ | $-3.09 \times 10^{-16}$ |

TABLE 6

| κ | 0.00 | $B_1$ | $-1.18 \times 10^{-06}$ |
|---|---|---|---|
| $A_4$ | $5.39 \times 10^{-08}$ | $B_2$ | $-9.25 \times 10^{-07}$ |
| $A_6$ | $-3.29 \times 10^{-12}$ | $B_4$ | $2.30 \times 10^{-11}$ |
| $A_8$ | $6.43 \times 10^{-18}$ | $B_6$ | 0.00 |
| $A_{10}$ | 0.00 | — | — |

Figure 10A:
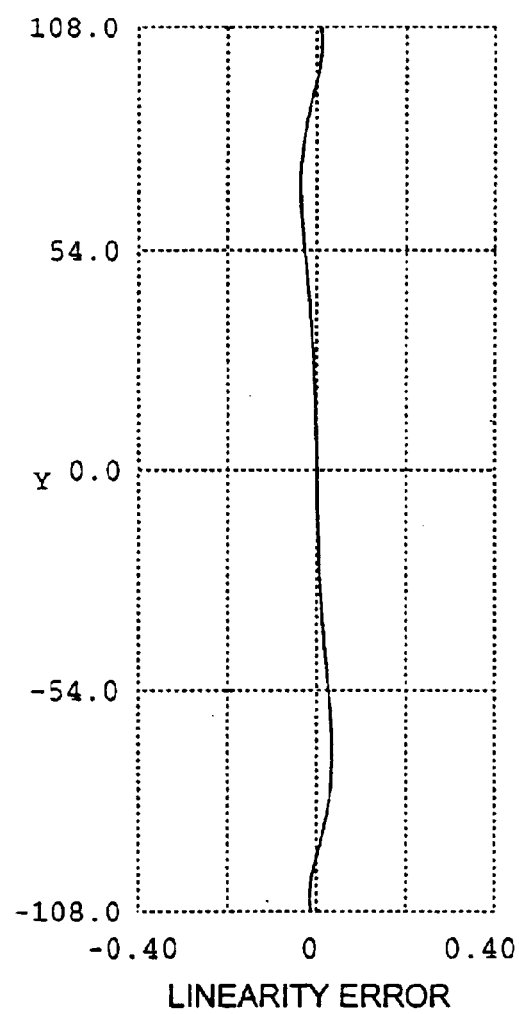
FIG. 10A is a graph showing a linearity error of the scanning optical system of the second embodiment.
Figure 10B:
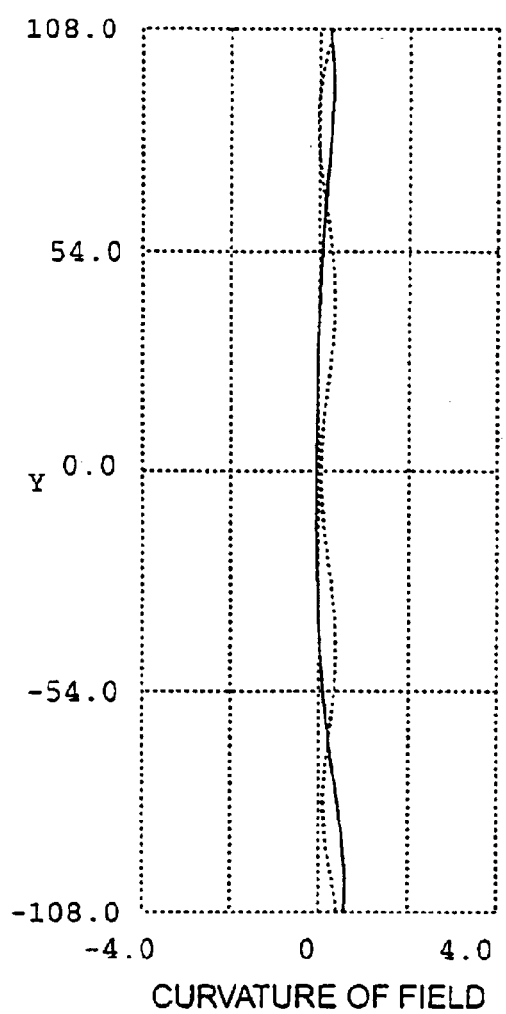
FIG. 10B is a graph showing a curvature of field of the scanning optical system of the second embodiment.

FIGS. 10A and 10B are graphs showing the optical performance of the scanning optical system of the second embodiment; FIG. 10A shows the linearity error; and FIG. 10B shows the curvature of field.

When the scanning optical systems of the first and second embodiments are applied to the tandem scanning optical system of FIG. 4, each of the first and second lenses 51 and 52 is formed as the complex lens having four lens portions, each of which is designed according to the data of the embodiments, stacked in the auxiliary scanning direction, and the third lens 53a designed according to the data of the embodiments is also employed as the other third lenses 53b to 53d.

Further, the complex lens is molded by the injection molding of the resin in the embodiment, while the method of the invention can be applied to another molding method employing the molding dies, such as a method to manufacture a glass molding lens or a hybrid lens having a resin layer on a glass lens.

As described above, since the lens surfaces of the complex lens at the incident side are formed by the single-piece mirror surface core and the lens surfaces at the exit side are formed by the other single-piece mirror surface core, the relative positional error among the lens surfaces at the incident side and that at the exit side can be reduced.

Further, when the mirror surface portions have concave sectional shapes in the auxiliary scanning direction, the boundary portions can be sharply processed by the cutting tool. Therefore, the mirror surface portions can be processed without the margins at the boundary portions, which avoids upsizing of the lens surfaces in the auxiliary scanning direction more than necessary.

The present disclosure relates to subject matter contained in Japanese Patent Application No. 2000-358852 filed on Nov. 27, 2000, which is expressly incorporated herein by reference in its entirety.

What is claimed is:

1. A manufacturing method of a complex lens for a tandem scanning optical system that consists of a plurality of stacked lens portions and said lens portions converging a plurality of light beams, which are modulated independently and deflected by a deflector, onto a surface to be scanned, respectively, for forming a plurality of scanning lines at the same time, said method comprising:
preparing molding dies for forming a cavity to form said complex lens as an integrally molded single-piece element; and
injecting lens material into said cavity,
wherein said molding dies include first and second single-piece mirror surface cores, each of the first and second single-piece mirror surface cores having a plurality of mirror surface portions, the plurality of mirror surface portions of the first single-piece mirror surface core respectively forming a plurality of lens surfaces at an incident side, the plurality of mirror surface portions of the second single-piece mirror surface core respectively forming a plurality of lens surfaces at an exit side.

2. The manufacturing method according to claim 1, wherein each of mirror surface portions of said mirror surface cores has a concave sectional shape in a direction perpendicular to the direction in which a plurality of light beams scan.

3. The manufacturing method according to claim 1, wherein said mirror surface portions of at least one of said mirror surface cores at the incident and exit sides are formed as rotationally-symmetrical concave surfaces with respect to respective optical axes.

4. The manufacturing method according to claim 1, wherein boundaries of each of said mirror surface portions of said mirror surface cores are formed as peaks.

5. The manufacturing method according to claim 4, wherein said boundaries formed as peaks are sharply processed by a cutting tool so that said mirror surface portions are provided without margins therebetween, and said plurality of stacked lens surfaces are formed without margins therebetween.

* * * * *